United States Patent
Balthasar (10) Patent No.: US 12,511,878 B2
(45) Date of Patent: Dec. 30, 2025

(54) METHOD AND SYSTEM FOR TRAINING A NEURAL NETWORK-IMPLEMENTED SENSOR SYSTEM TO CLASSIFY OBJECTS IN A BULK FLOW

(71) Applicant: Tomra Sorting GmbH, Mülheim-Kärlich (DE)

(72) Inventor: Dirk Balthasar, Boppard (DE)

(73) Assignee: Tomra Sorting GmbH, Mülheim-Kärlich (DE)

( * ) Notice: Subject to any disclaimer, the term of this patent is extended or adjusted under 35 U.S.C. 154(b) by 300 days.

(21) Appl. No.: 18/000,698

(22) PCT Filed: Jun. 2, 2021

(86) PCT No.: PCT/EP2021/064744
§ 371 (c)(1),
(2) Date: Dec. 5, 2022

(87) PCT Pub. No.: WO2021/245118
PCT Pub. Date: Dec. 9, 2021

(65) Prior Publication Data
US 2023/0206606 A1    Jun. 29, 2023

(30) Foreign Application Priority Data

Jun. 4, 2020   (EP) .................................... 20178299

(51) Int. Cl.
*G06V 10/774* (2022.01)
*G06V 10/147* (2022.01)
(Continued)

(52) U.S. Cl.
CPC .......... *G06V 10/774* (2022.01); *G06V 10/147* (2022.01); *G06V 10/764* (2022.01); *G06V 10/82* (2022.01); *G06V 2201/06* (2022.01)

(58) Field of Classification Search
CPC .. G06V 10/774; G06V 10/147; G06V 10/764; G06V 10/82; G06V 2201/06; G06V 20/52
See application file for complete search history.

(56) References Cited

U.S. PATENT DOCUMENTS

| | | | |
|---|---|---|---|
| 2017/0148487 A1* | 5/2017 | Krishnakumar | ..... G11B 27/031 |
| 2018/0243800 A1 | 8/2018 | Kumar et al. | |

(Continued)

FOREIGN PATENT DOCUMENTS

| | | |
|---|---|---|
| EP | 3422255 A1 | 1/2019 |
| JP | 2017-109197 A | 6/2017 |
| JP | 2020-62633 A | 4/2020 |

OTHER PUBLICATIONS

International Search Report (PCT/ISA/210) with translation and Written Opinion (PCT/ISA/237) mailed on Aug. 31, 2021, by the European Patent Office as the International Searching Authority for International Application No. PCT/EP2021/064744. (14 pages).

(Continued)

*Primary Examiner* — Helen Zong
(74) *Attorney, Agent, or Firm* — Buchanan Ingersoll & Rooney PC (57) ABSTRACT

A method of training a neural network stored on a computer-readable storage medium to classify objects in a bulk flow, the method including: providing input image data depicting objects to be classified, which input image data is captured by means of an input imaging sensor of a first sensor technology design; providing auxiliary image data, which auxiliary image data is captured by means of an auxiliary imaging sensor of a second sensor technology design, and which auxiliary image data depicts said or similar objects which are classified in accordance with a predetermined classifying scheme; by means of a processing unit, train the neural network stored on the computer-readable storage medium to classify the depicted objects in the input image (Continued)

data based on classifications of depicted objects in the auxiliary image data, wherein the depicted objects in the input image data correspond to objects in a bulk flow.

14 Claims, 9 Drawing Sheets

(51) Int. Cl.
*G06V 10/764* (2022.01)
*G06V 10/82* (2022.01)

(56) References Cited

U.S. PATENT DOCUMENTS

| | | | |
|---|---|---|---|
| 2019/0005353 A1* | 1/2019 | Tullberg | G06F 18/214 |
| 2022/0215554 A1* | 7/2022 | Geurts | G06T 7/11 |
| 2024/0246117 A1* | 7/2024 | Kumar | B07C 5/3422 |

OTHER PUBLICATIONS

Office Action (Communication pursuant to Article 94(3) EPC) issued on Apr. 29, 2024, by the European Patent Office in corresponding European Application No. 20 178 299.2-1207. (56 pages).
Office Action (the First Office Action) issued on Oct. 25, 2025, by the State Intellectual Property Office of People's Republic of China in corresponding Chinese Patent Application No. 202180058286.7, with English Translation, (31 pages).

* cited by examiner

METHOD AND SYSTEM FOR TRAINING A NEURAL NETWORK-IMPLEMENTED SENSOR SYSTEM TO CLASSIFY OBJECTS IN A BULK FLOW

TECHNICAL FIELD

The present invention relates to the field of classifying objects in a bulk flow. More particularly, the present invention relates to a method and system for training a neural network stored on a computer-readable storage medium to classify objects in a bulk flow and also a system implementing such a trained neural network in a neural network-implemented sensor system for classifying and optionally sorting objects in a bulk flow.

BACKGROUND

Autonomous classification is a topical field of research with implications for e.g. recycling, mining or food processing. For a recycling implementation, classifying techniques are used when sorting a mixture of garbage into the correct recycling bin. As technology evolves, this classification and consequently sorting may be done more accurately and faster than before.

In US 2018/243800 AA, a machine learning system for sorting a stream of single objects is disclosed, which machine learning system allows for an accurate classification of the objects when being sorted. However, such techniques are slow as they may only process a single stream of objects at a time.

Furthermore, in order to achieve satisfactory classification results using a machine learning system, it is important that sensor data used by the machine learning system is of high quality. This consequently leads to incorporating expensive sensors which naturally hinders machine learning systems from being economically feasible for classification applications and in particular sorting applications.

There is thus a need for improvements in this regard.

SUMMARY

It is an object of the present invention to provide an improved solution that alleviates the mentioned drawbacks with present solutions. This object has now been achieved in accordance with the invention by the novel technique of training a neural network stored on a computer-readable storage medium, the novel neural network-implemented sensor system implementing such a trained neural network and a method of sorting objects in a bulk flow by means of a trained neural network, all of which are set forth in the appended independent claims, wherein preferred embodiments are defined in the related dependent claims.

According to a first aspect of the invention, this is provided by a method of training a neural network stored on a computer-readable storage medium to classify input image data in terms of depicted objects. The method comprises the steps of: providing input image data depicting objects to be classified, which input image data is captured by means of an input imaging sensor of a first sensor technology design; providing auxiliary image data, which auxiliary image data is captured by means of an auxiliary imaging sensor of a second sensor technology design, and which auxiliary image data depicts said or similar objects which are classified in accordance with a predetermined classifying scheme; by means of a processing unit, train the neural network stored on the computer-readable storage medium to classify the depicted objects in the input image data based on classifications of depicted objects in the auxiliary image data, wherein the depicted objects in the input image data correspond to objects in a bulk flow, and wherein the second sensor technology design is different from the first sensor technology design.

An advantage of this training method is that it may provide a trained neural network capable of classifying depicted objects in the input image data in an efficient manner and more reliably than conventional solutions. This is achieved due to the method making use of differences in the image data provided imaging sensors of the differing first and second sensor technology designs. By this, hard-to-classify or unclassifiable depictions within the input image data may be classified when correlated to classified depictions in auxiliary image data.

As an illustrative example for the purpose of explaining this working principle in more detail, pose that the input imaging sensor of the first sensor technology design is configured to provide input image data of one real object A, depicted as object depiction A* at some resolution, and pose further that the auxiliary imaging sensor of the second sensor technology design is configured to provide auxiliary image data depicting the same real object A as object depiction A** at a resolution greater than resolution of the object depiction A* which higher resolution allows for correct classification of the object depiction A** as the real object A. Then the identified object depiction A* in the input image data, assuming it can be identifiable as some object depiction A* based on some characterizing features in contrast with the depicted environment, may be correlated to the classified object depiction A** and thereby enabling the object depiction A* to be accurately classified by reference, even if the object depiction A* within the input image data does not enable it to be correctly classified as the real object A directly.

Thus, when trained accordingly by this training method, the neural network is configured to identify depicted objects A* as objects A, without needing assistance from the classifications of the depicted objects in the auxiliary image data. A neural network may be trained to correlate object depictions in input imaging data, which object depictions due to image quality may be difficult to be classify correctly, to depictions in auxiliary image data, thereby enabling the classification of the depicted objects in the input imaging data. Further, the classified auxiliary image data may train the neural network to disambiguate depicted objects within the input image data.

Although the illustrative example above poses merely different image resolutions, this working principle is applicable when the input imaging sensor and the auxiliary imaging sensor are selected to be of other sensor technology designs, for instance when the input imaging sensor and the auxiliary imaging sensor are of different general sensor technology designs, e.g. RGB-sensor technology and NIR-sensor technology, or are of the same general sensor technology design, e.g. RGB sensor technology, but have qualitative differences available for said same general sensor technology, e.g. different resolutions. Thus, the input imaging sensor of a first sensor technology design and the auxiliary imaging sensor of a second sensor technology design may be sensors of different general sensor technologies or sensors of the same general sensor technology but with qualitative differences.

Regarding the neural network that is stored on the computer-readable storage medium, it may be an artificial neural network comprising an input layer and an output layer. It may also comprise one or more hidden layers between the input layer and the output layer. Each neuron in the input layer may correspond to a predetermined region of images. Further, by computer-readable storage medium it may mean a medium capable of storing data in a format readable by a computer, i.e. a mechanical device with computational capabilities. Said computer-readable storage medium may e.g. be a disk storage, memory cards, USB, optical discs, volatile or non-volatile memory etc. The neural network stored on the computer-readable storage medium may be trained in real-time as image data is captured of the bulk flow. Alternatively, the neural network stored on the computer-readable storage medium may be trained separately from the moment where image data was captured of the bulk flow in a virtual environment provided by a computing device, such as a computer, a mobile device, a server etc.

Further, the objects being depicted may be objects in a bulk flow. By bulk flow, it may mean a flow of objects wherein the objects are in bulk. It may also include the case wherein the flow of objects are objects which are momentarily spatially separated from other objects so that they can be depicted as singular objects of the bulk flow in the field of view of imaging sensors. The imaging sensors may capture image data of the objects in the bulk flow, either when momentarily stopped or when the objects are in motion. Moreover, objects in the bulk flow when depicted by input imaging sensors or auxiliary imaging sensors may overlap each other as seen in the image data, thereby possibly obscuring each other to some degree. The neural network may be trained to classify objects in the bulk flow in a satisfactory manner even if they overlap each other, for instance by incorporating information from a plurality of sensors of the same or different sensor technology design.

Further, it is recognized that the training method may be applied to train a neural network to classify objects which are not moving in bulk but are generally spatially separated to move as individual objects in a corresponding object flow, and it should be understood that the invention in all its aspects and corresponding embodiments disclosed herein may be applied mutatis mutandis to such an application.

It is also worthwhile to comment that by the term 'image data', it may mean images, or data which can be represented as images, such as distance information from a sensor to various points of a objects. Thus, by the term "depicted object" it refers to an object visible in the image data.

Also, as disclosed, the depicted objects in the auxiliary image data captured by the auxiliary imaging sensor is classified according to a predetermined classifying scheme. The predetermined classifying scheme may be a classifying scheme involving the step of identifying characterizing features in the auxiliary image data and classifying a collection of characterizing features as some object based on the identified characterizing features with a satisfactory accuracy. Here, satisfactory accuracy may mean an accuracy of at least e.g. 95% or 99% or more, or 100%. By e.g. 99% accuracy, it may mean that for every 100 classification attempts, 1 of these classifications statistically were erroneous in some way. By 100% accuracy, it may mean that for every 100 classification attempts, 0 of these were statistically erroneous in some way, or that only 1 erroneous classification occurs statistically for every 1000, 10000, 100000 etc. classification attempts.

Further, by the wording "classifying the depicted objects", it may be meant that if an image data depicts an object A, then the image data is determined to depict the classified object A. Alternatively, it may mean that the image data is classified as an image data depicting object A.

Further, if an image data depicts objects A and B, then said wording "classifying the depicted objects" may mean that the image data is determined to depict classified object A or B, or that the image data is determined to depict the combination of classified objects A and B. Alternatively, it may mean that the image data is classified as an image data depicting objects A or B, or that the image data is classified as an image data depicting the combination of objects A and B.

Further, by the wording "classified auxiliary image data depicting said or similar objects", it may mean that the input imaging sensor and the auxiliary imaging sensor depict the same one or more objects, either simultaneously or at different moments in time in respective detection zones. It may also mean auxiliary image data depicting similar objects which are classified accordingly, which classified objects or classified auxiliary image data are accessible in a library of classified auxiliary image data.

According to one embodiment, the second sensor technology design is of a sensor technology design capable of providing higher quality image data than the first sensor technology design and/or auxiliary image data not provided by the first sensor technology design. By this, a neural network may be trained to be more efficient and more reliable in classifying objects in the bulk flow. If the second sensor technology is selected appropriately, objects which are naturally more difficult to classify due to texture or other properties may be more easily classified by the neural network when trained on classifications of depicted objects in the auxiliary image data resulting from the selected second sensor technology. For instance, the neural network may be trained to be able to classify objects depicted in input image data captured by means of an RGB-sensor based on classifications of depicted objects in auxiliary image data captured by means of a near infrared-, NIR, sensor or an X-ray sensor. Thus, the trained neural network may be configured to classify depicted objects in a satisfactory manner using much cheaper sensors.

According to one embodiment, the step of training the neural network stored on the of the computer-readable storage medium is further based on additional non-image data, or user specified data, of the objects to be classified. By non-image data, it may mean weight measurements, volume measurements, magnetic detection, or sound (from e.g. bounces or movements of the objects) measurements. This may further improve the trained neural network to classify objects in a bulk flow in a satisfactory manner.

According to one embodiment, the method further comprises the step of providing the neural network stored on the computer-readable storage medium in a neural network-implemented sensor system configured to capture said input image data of the bulk flow by means of at least one input imaging sensor of the first sensor technology design. The neural network may be trained when provided in said neural network-implemented sensor system.

According to one embodiment, the neural network-implemented sensor system is arranged to monitor operations of a classification- and/or a sorting system configured to capture said auxiliary image data of the bulk flow by means of at least one auxiliary imaging sensor, and which classification- and/or sorting system comprises means for classifying the objects depicted in the auxiliary image data according to the predetermined classifying scheme. By this, the neural network implemented in the neural network-implemented sensor system may be trained in real time based on information acquired by the step of monitoring the classification- and/or sorting system. The classification- and/or sorting system may be configured to improve the quality of the classification provided by the classification means, and the neural network of the neural network-implemented sensor system may be trained to classify accordingly but using the input imaging sensors rather than the auxiliary imaging sensors. Hence, a more cost-efficient may be provided.

According to one embodiment, the method further comprises the step of providing first and at least a second input image data depicting objects to be classified, wherein the first and the at least second input image data are captured by means of a respective first and at least a second input imaging sensor of the first sensor technology design, the first input imaging sensor configured to capture input image data of the objects in the bulk flow in a first detection zone and the at least second input imaging sensor configured to capture input image data of the objects in the bulk flow in an at least second detection zone, wherein the at least second detection zone is different from the first detection zone and the step of training the neural network stored on the computer-readable storage medium is further based on differences between the first and the at least second input image data.

By detection zone, it may mean the general area where imaging sensors capture image data. It may mean the area bounded by the field of view by an imaging sensor. Moreover, the neural network may be trained based on image data corresponding to two or more detection zones, for instance three, four, five, six, seven, eight, nine or ten detection zones. One or more detection zone may be assigned to detect specific objects of the bulk flow. The bulk flow may be sorted in conjunction with each respective detection zone. Two consecutive detection zones may be arranged some predetermined distance apart from each other. The sorting between two detection zones may be performed automatic by robots, but in some embodiments there may be human interaction for sorting some specific object. Hereby, it is possible for the system to be trained also partly by the human amending the bulk flow between to detection zones, e.g. to remove specific objects from the bulk flow.

By the wording "training . . . based on differences between the first and the at least second input image data", it may mean that the neural network may take into account successfully classified objects from one of the input imaging data to infer classification of a depicted object in another of the input imaging data, thereby improving classification in more difficult situations. As an example, pose that an object at a first detection zone is obscured to some degree by other objects when being depicted in the first captured input image data. Then as it travels to the next detection zone, the objects move about, thereby obscuring said object less which allows for accurate classification. This in combination with information about objects being removed or added into the bulk flow between the first and next detection zone, it may be possible to infer the classification to the obscured object, and thus training the neural network to classify objects when obscured to some degree.

Further, information how the bulk flow changes between the first and second detection zones may be provided which may facilitate training of the neural network.

Further, one or more of the first and the at least second input imaging sensor may be of a sensor technology design different from the others. By this, more versatile classification may be enabled along a single stream of the bulk flow.

According to one embodiment, at least two of the first and the at least second input imaging sensors are of different sensor technology designs. By this, the neural network may be trained to classify objects in a facilitated manner. For instance, the at least two input imaging sensors may be arranged to capture input image data at two consecutive detection zones. Thus, the neural network may be trained to take into account information about a depicted object as depicted differently in each of the input image data. This may further reduce ambiguity in classification of certain objects, thereby improving the neural network trained.

According to one embodiment, the first sensor technology design and the second sensor technology design are selected from a group of sensor technology designs including near infrared sensor, X-ray sensor, CMYK-sensor, RGB-sensor, a volumetric sensor, point measurement system for spectroscopy, visible light spectroscopy, nir infrared spectroscopy, mid infrared spectroscopy, X-ray fluorescence sensors, electromagnetic sensors, laser sensor such as line laser triangulation system or a scanned laser for scattered laser, multispectral systems using LED's, pulsed LED's or lasers, LIBS (laser induced breakdown spectroscopy), Fluorescence detection, detectors for visible or invisible markers, transmission spectroscopy, transflectance/intreractance spectroscopy, softness measurement, thermal camera, and/or wherein the first sensor technology design and the second sensor technology design are of the same general sensor technology design but have different qualitative differences.

According to a second aspect of the invention, a neural network-implemented sensor system is provided. The neural network-implemented sensor system comprises one or a plurality of input imaging sensors configured to capture input image data of objects in a bulk flow, and a computer-readable storage medium storing a trained neural network which is trained by the method according to the first aspect of the invention or any embodiments thereof.

The neural network may be trained specifically with such a neural network-implemented sensor system in mind. This may allow for more efficient classification process. Further, the neural network-implemented sensor system may be modular with respect to complexity and size of the bulk flow. Hence, the neural network may be configured for a desired application.

The neural network-implemented sensor system may be configured to communicatively couple to a processing device, e.g. a computer, a mobile device, a server etc., comprising a processor configured to process classification of the depicted objects in the input image data. The neural network-implemented sensor system may comprise a processing unit. The neural network-implemented sensor system may comprise a plurality of input imaging sensors of the first sensor technology design. The input imaging sensors may be of different sensory technology designs. The input imaging sensors may be arranged to capture input image data of objects in the bulk flow at different detection zones. Two or more input imaging sensors may be arranged to capture input image data at the same detection zone, for instance in different directions or to provide input imaging data which can be combined into a single input image data corresponding to said detection zone.

According to one embodiment, the neural network-implemented sensor system is configured to be arranged to a bulk flow distribution system and configured to classify the objects in the bulk flow distributed thereby. By "distribution system" it may mean a system for distributing the bulk flow, for instance by means of conveyor belts. Such a distributing system may be configured to branch off in smaller bulk flows and/or a plurality of branches of bulk flows may be combined into a larger bulk flow. The neural network-implemented sensor system may be configured to classify the objects within the bulk flow at respective detection zone along the distribution system. The classifications determined by the neural network-implemented sensor system may be transmitted to a monitoring terminal of the distribution system, whereby the classified objects are presented so as to enable monitoring of objects within the bulk flow.

According to one embodiment, the neural network-implemented sensor system is configured to be arranged to a bulk flow sorting system and configured to sort the objects in the bulk flow by means of one or more sorting units based on classifications provided by the trained neural network. By "bulk flow sorting system" or "sorting system", it may be meant a distribution system with sorting capabilities.

According to one embodiment, the neural network-implemented sensor system is configured to share the neural network on the computer-readable storage medium to a second neural network-implemented sensor system. By this, a single neural network may be trained which is then distributed into at least one other neural network-implemented sensor system. By this, each individual neural network-implemented sensor system need not be trained; a single trained neural network may be shared over a plurality of neural network-implemented sensor system. This may ensure that a plurality of neural network-implemented sensor system all operate the same in terms of classification operation. By "sharing" it may mean that a neural network is copied and stored on each respective computer-readable storage medium of a plurality of neural network-implemented sensor systems. Alternatively, by "sharing" it may mean that all of the neural network-implemented sensor system accesses the neural network stored on a mutual computer-readable storage medium.

According to one embodiment, the one or the plurality of input imaging sensors are selected from a group of sensor technology designs including near infrared sensor, X-ray sensor, CMYK-sensor, RGB-sensor, a volumetric sensor, point measurement system for spectroscopy, visible light spectroscopy, nir infrared spectroscopy, mid infrared spectroscopy, X-ray fluorescence sensors, electromagnetic sensors, laser sensor such as line laser triangulation system or a scanned laser for scattered laser, multispectral systems using LED's, pulsed LED's or lasers, LIBS (laser induced breakdown spectroscopy), Fluorescence detection, detectors for visible or invisible markers, transmission spectroscopy, transflectance/intreractance spectroscopy, softness measurement, thermal camera, and/or wherein at least two of the plurality of input imaging sensors are of the same general sensor technology design but have different qualitative differences.

According to a third aspect of the invention, a method of sorting objects in a bulk flow by means of a sorting system is provided. The sorting system comprises a neural network-implemented sensor system according to the second aspect of the invention or any embodiments thereof. The method comprises the steps of: capturing input image data of the objects in the bulk flow at a first detection zone by means of at least one input imaging sensor of the first sensor technology design; by means of a processing unit, classify depicted objects in the input image data using the classification outputs by the trained neural network of the computer-readable storage medium, and sorting the objects in the bulk flow by means of a sorting unit based on how objects depicted are classified. By this, objects may be reliably sorted in an efficient and scalable manner. The method may be applied to sort objects by means of a plurality of sorting units, each arranged at or following a detection zone. Each detection zone may be configured to detect a specific type of object within the bulk flow, thereby reducing the variety of objects within the bulk flow after each detection zone or after a series of detection zones working in tandem to detect a specific object type.

The invention is defined by the appended independent claims, with embodiments being set forth in the appended dependent claims, in the following description and in the drawings.

BRIEF DESCRIPTION OF THE DRAWINGS

The invention will in the following be described in more detail with reference to the enclosed drawings, wherein.

LIST OF REFERENCE NUMERALS

NN—Neural Network
TNN—Trained Neural Network
A-E—Objects in bulk flow
A*-E*—Objects as depicted in input image data
A*-E*—Objects as depicted in auxiliary image data
10—Computer-Readable Storage Medium
20—Processing unit
30, 30a-30e—Input imaging sensor(s)
40, 40a-40e—Auxiliary imaging sensor(s)
50, 50a-50e—Detection zone(s)
50*—Input image data
50**—Auxiliary image data
60—Neural network-implemented sensor system
70—Classification and/or sorting system
71—Means for classifying objects
72—Sorting unit
73—Means for transportation
74—Terminal
100—Training method
101-104—Training method steps
200—Sorting method
201-203—Sorting method steps

DESCRIPTION OF EMBODIMENTS

The present invention will be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Figure 1:
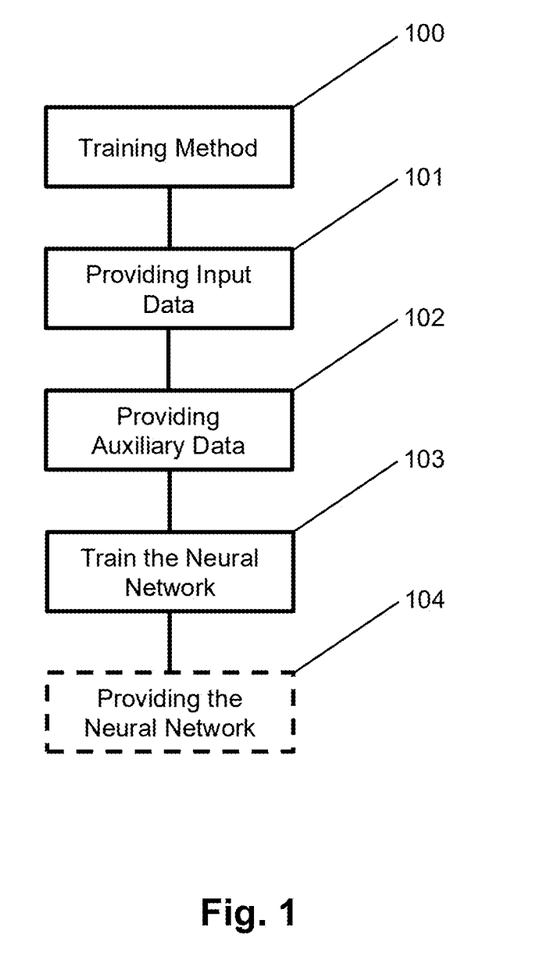
FIG. 1 shows a flowchart for a method for training a neural network according to one embodiment.
Figure 2:
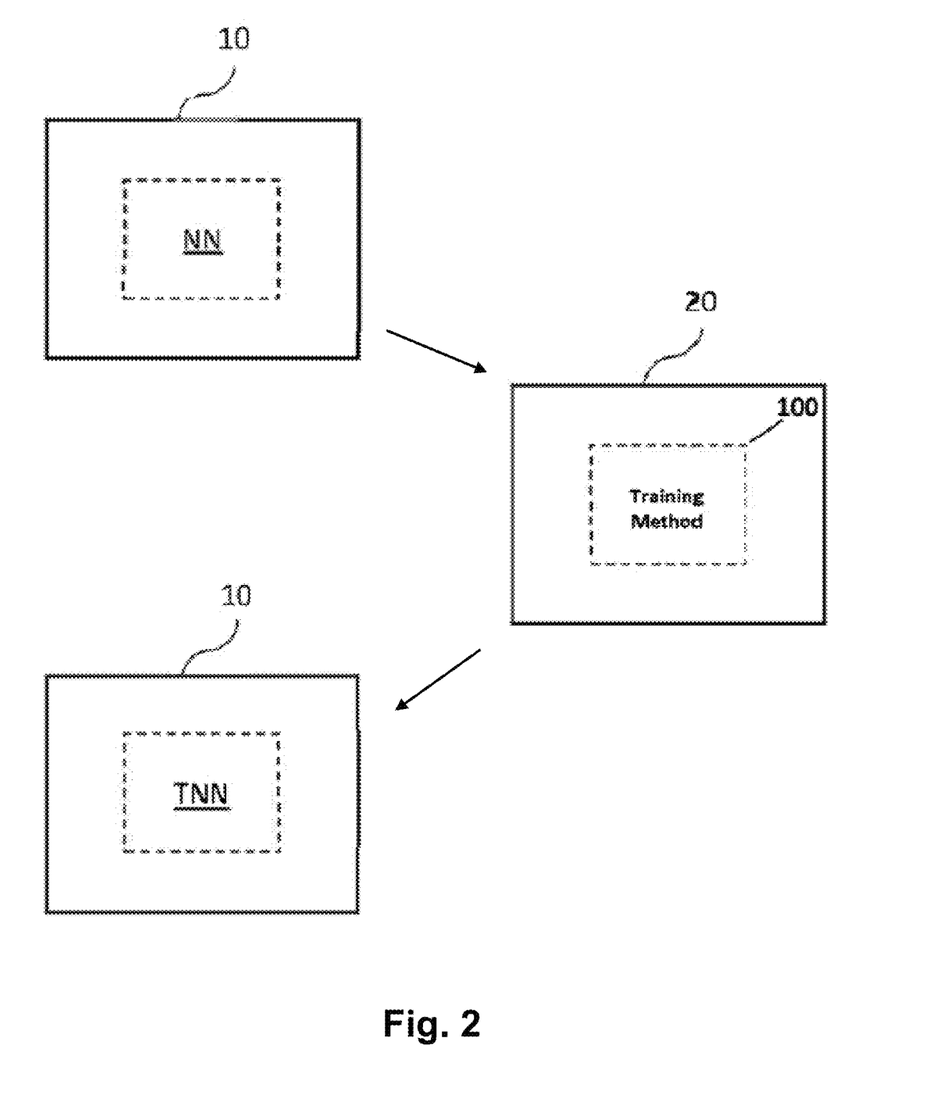
FIG. 2 shows a computer-readable storage medium storing a neural network which trained by the disclosed training method according to one embodiment.

FIG. 1 shows a flowchart of the training method 100. By this, a neural network NN stored on a computer-readable storage medium 10 is trained to classify objects A-E in a bulk flow by means of the training method 100 executed by a processing unit 20, thereby resulting in the neural network NN stored on the computer-readable storage medium 10 into becoming a trained neural network TNN, as can be seen in FIG. 2. This trained neural network TNN may then by readily used in various applications involving classifying objects A-E in a bulk flow.

Figure 3A:
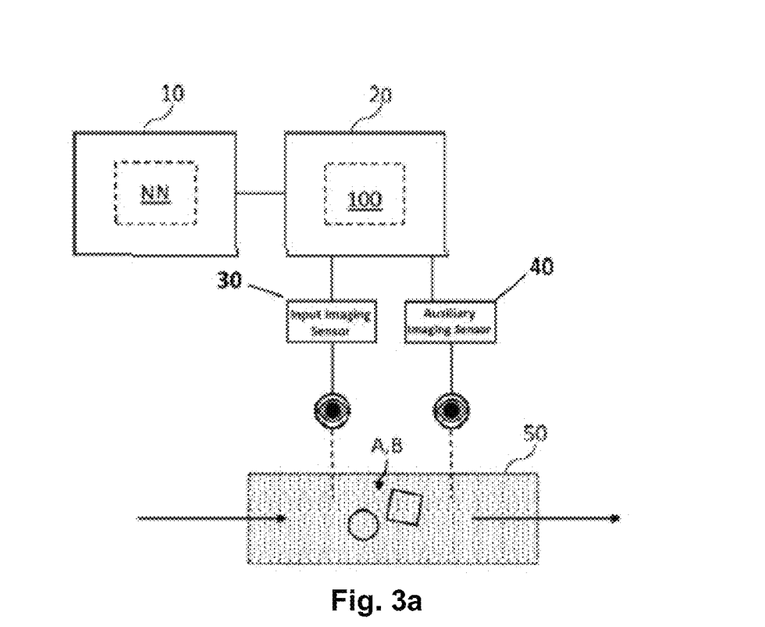
FIGS. 3a-3b show a computer-readable storage medium storing a neural network being trained by the disclosed training method according to one embodiment.
Figure 3B:
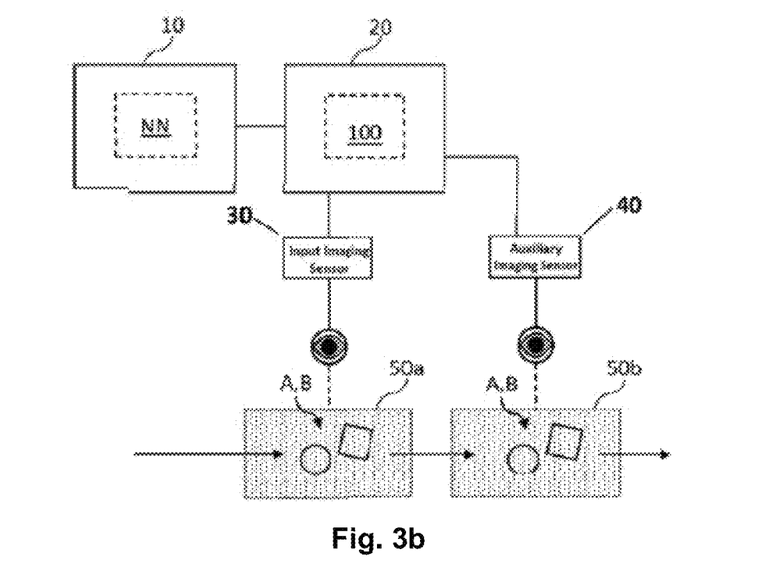

FIG. 3a shows the setup of how the training method 100 may be carried out according to one embodiment. The neural network NN stored on the computer-readable storage medium 10 is trained by means of the training method 100 executed by a processing unit 20. In the training method 100, both input image data 50* and auxiliary image data 50** are used. The input image data 50* is captured by means of an input imaging sensor 30. The auxiliary image data 50** is captured by means of an auxiliary imaging sensor 40. Both the input imaging sensor 30 and the auxiliary imaging sensor 40 are configured to capture image data of objects A, B in a bulk flow which is flows through the detection zone 50 where image data is captured, as seen in FIG. 3a. The input image data 50* and the auxiliary image data 50** need not be captured at the same time. Rather, according to some embodiments, the input imaging sensor 30 may be configured to capture input image data 50* of objects A, B in the bulk flow at a first detection zone 50a, while the auxiliary imaging sensor 40 may be configured to capture auxiliary image data 50** of the objects A, B at a second detection zone 50b, as shown in FIG. 3b.

Moreover, the training method need not be performed at the time when the input image data 50* and the auxiliary input image data 50** are captured. The training method 100 may be performed based on image data 50*, 50** stored on a computer-readable storage medium at a later time. Moreover, the auxiliary image data 50* may be image data already captured of similar objects.

Figure 4A:
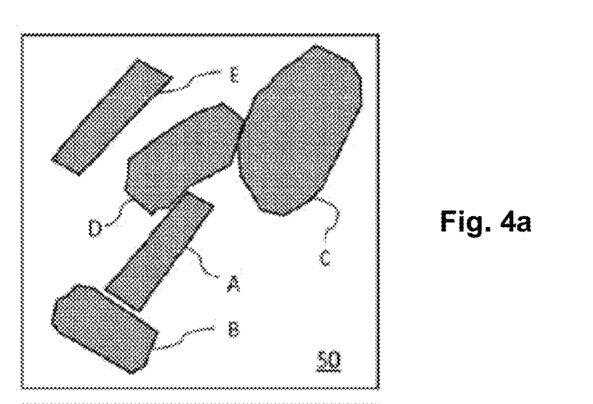
FIG. 4a shows an arrangement of objects in a bulk flow at a detection zone.
Figure 4B:
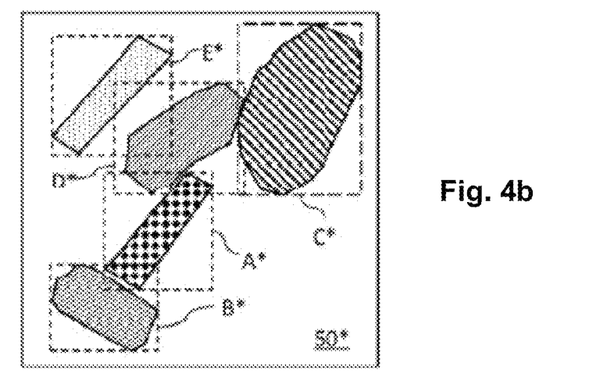
FIG. 4b shows an input image data depicting objects in a bulk flow according to one embedment.

Referring back to FIG. 1, the training method comprises the step of providing 101 input image data 50* depicting objects A*-E* to be classified, which input image data 50* is captured by means of an input imaging sensor 30 of a first sensor technology design. An example of an input image data is shown in FIG. 4b, which depicts the real objects A-E of the bulk flow in a detection zone 50. As illustrated in FIG. 4b by different patterns, the object depictions A*-E* may not be adequate representations of the real objects A-E, which may be a result of the limitations and/or properties first sensor technology design.

Figure 4C:
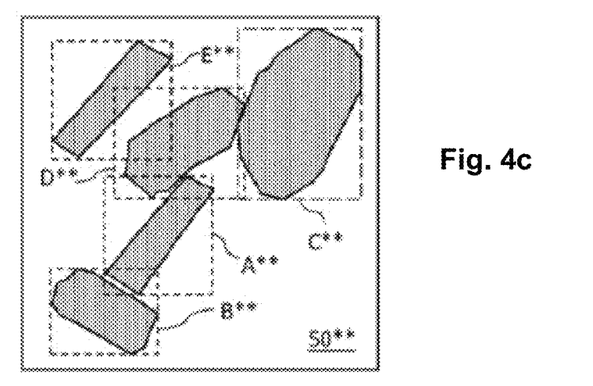
FIG. 4c shows an auxiliary image data depicting objects in a bulk flow according to one embedment.

Further, the training method comprises the step of providing 102 auxiliary image data 50*, which auxiliary image data 50 is captured by means of an auxiliary imaging sensor 40 of a second sensor technology design, and which auxiliary image data 50 depicts said or similar objects A-E which are classified in accordance with a predetermined classifying scheme. An example of an auxiliary image data is shown in FIG. 4c, which depicts the real objects the real objects A-E of the bulk flow in the detection zone 50. As illustrated in FIG. 4c, the depicted objects A-E have patterns which are more similar of the patterns of the real objects A-E in the detection zone 50, which illustrates that the image quality of the auxiliary image data allows for more accurate classification by means of the predetermined classifying scheme.

Further, the training method 100 comprises the step of training the neural network NN stored on the computer-readable storage medium 10, by means of a processing unit 20, to classify the depicted objects A*-E* in the input image data 50* based on classifications of depicted objects A-E in the auxiliary image data 50**. In one embodiment, this is enabled by correlating the object depictions A*-E* in the input image data 50* with object depictions A-E in the auxiliary image data 50** which in turn are classified. Thus, the trained neural network TNN may be configured to be able to classify the object depictions A*-E* accurately even if the image quality of the input image data 50* is of an image quality making it difficult to accurately classify depicted objects A*-E*.

As apparent, the training method 100 is intended to train a neural network NN to classify objects A-E in a bulk flow. However, the training method 100 may be applicable to train a neural network NN to classify objects A-E in a product line where objects are arranged in an ordered fashion, for instance for the purpose of training a neural network to detect faulty products based on some predetermined criteria.

Also, the second sensor technology design is different from the first sensor technology design. In some embodiments, the second sensor technology design is of a sensor technology design capable of providing higher quality image data than the first sensor technology design and/or auxiliary image data not provided by the first sensor technology design.

Figure 5A:
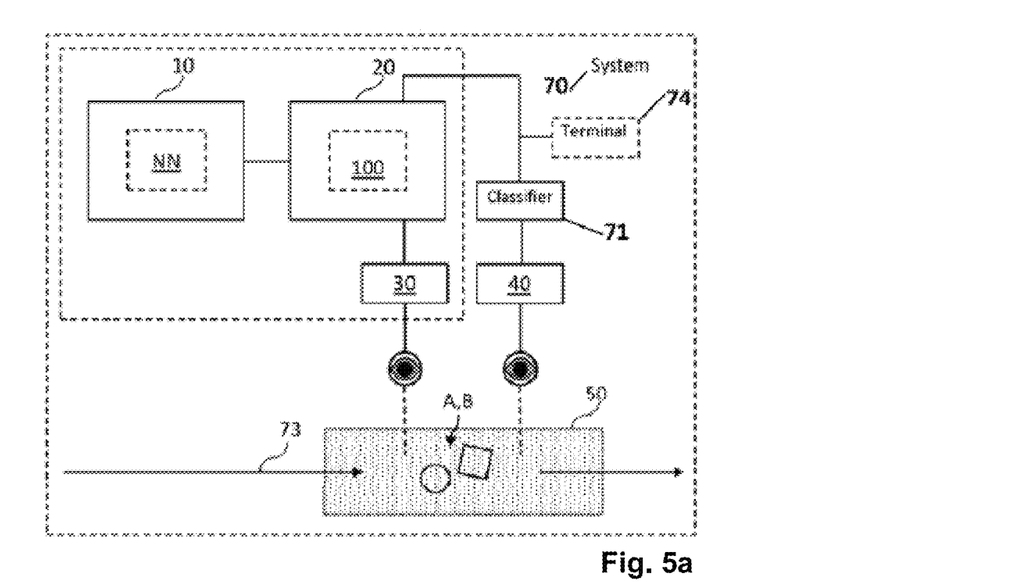
FIGS. 5a-5b show the neural network-implemented sensor system according to one embodiment.

The training method 100 comprises in some embodiments the step of providing 104 the neural network NN stored on the computer-readable storage medium 10 in a neural network-implemented sensor system 60 configured to capture said input image data 50* of the bulk flow by means of at least one input imaging sensor 30 of the first sensor technology design. This is shown in FIG. 5a, wherein the neural network-implemented sensor system 60 comprises the computer-readable storage medium 10 storing the neural network NN to be trained; the processing unit 20 configured to execute the training method 20; and one input imaging sensor 30 configured to capture input image data 50* of objects A, B in a detection zone 50. Although the neural network-implemented sensor system 60 is only shown in FIG. 5a with a single input imaging sensor 30, the neural network-implemented sensor system 60 may comprise a plurality of input imaging sensors. The plurality of input imaging sensors may be arranged to capture input image data at different detection zones, and in some embodiments, two or more of the plurality of input imaging sensors may be arranged to capture input imaging data of objects in the bulk flow at the same detection zone. The plurality of input imaging sensors may be of the same first sensor technology design, or any combination thereof.

Moreover, in FIG. 5a, the neural network-implemented sensor system 60 is arranged to monitor operations of a classification- and/or a sorting system 70, which is configured to capture said auxiliary image data 50** of the bulk flow by means of at least one auxiliary imaging sensor 40. The classification- and/or sorting system 70 further comprises means 73 for enabling the bulk flow of objects, and in some embodiments, this means 73 is a conveyor belt system.

Further, the classification- and/or sorting system 70 comprises means 71 for classifying the objects A-E depicted in the auxiliary image data 50 according to the predetermined classifying scheme. The means 71 may be a processing unit or comprise a processing unit configured to execute such a predetermined classifying scheme. As shown in FIG. 5a, the processing unit 20 of the neural network-implemented sensor system is configured to access or receive the auxiliary image data 50** and the corresponding classifications of the object depictions A-E thereof, thereby enabling the neural network stored on the computer-readable storage medium 10** to be trained.

Figure 5B:
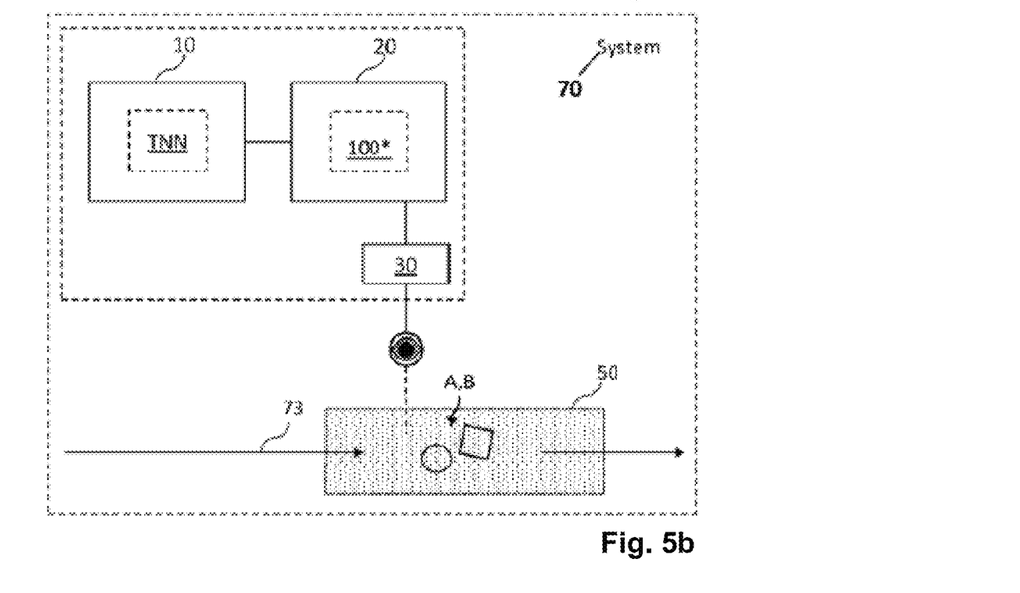

FIG. 5b shows the neural network-implemented sensor system 60 provided with a trained neural network TNN. The neural network-implemented sensor system 60 is due to the trained neural network TNN configured to classify objects A, B in a satisfactory manner without needing assistance form the auxiliary imaging sensor 40. The neural network-implemented sensor system 60 allows for a classification method 100* to classify objects A, B in the bulk flow. This classification method 100* may comprise the step of capturing input image data 50* of objects A, B in a bulk flow at a first detection zone 50, and classifying the objects A, B by means of the trained neural network TNN using the input image data 50* as an input to the trained neural network TNN.

Figure 6:
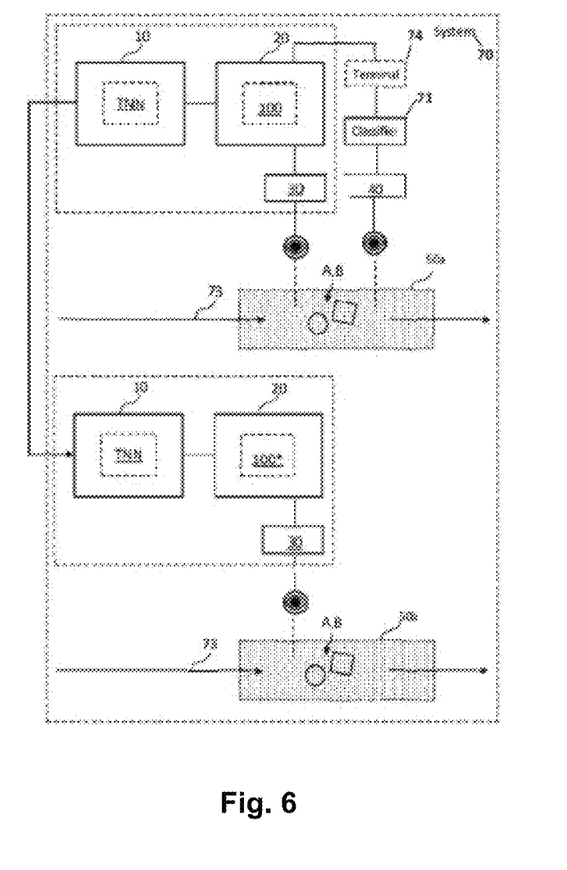
FIG. 6 shows the neural network-implemented sensor system according to one embodiment.

FIG. 6 show a plurality of neural network-implemented sensor systems 60a, 60b according to one embodiment. The first neural network-implemented sensor system 60a is configured to share the trained neural network TNN stored on the computer-readable storage medium 10 to a second neural network-implemented sensor system 60b. The second neural network-implemented sensor system 60b is then configured to, by means of the trained neural network TNN, to classify objects A, B according to the classifying method 100*. The plurality of neural network-implemented sensor system 60a, 60b may comprise more than two such systems, for instance, anywhere from 2 to 10 or more, each of which are arranged to classify and/or sort objects in a bulk flow.

Figure 7:
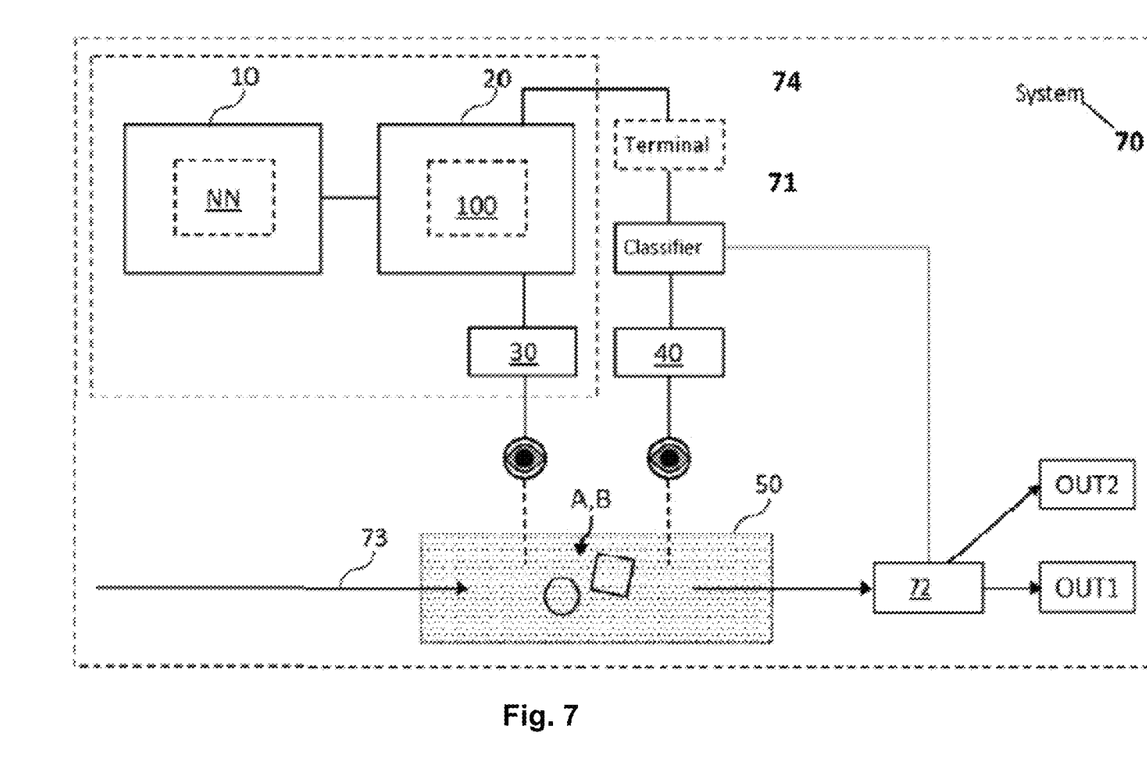
FIG. 7 shows the neural network-implemented sensor system according to one embodiment.

FIG. 7 shows an embodiment wherein the neural network-implemented sensor system 60 is arranged in a sorting system 70 comprising a sorting unit 72 configured to sort objects into different streams OUT1, OUT2, wherein the sorting is based on classifications of said objects. The neural network NN of the neural network-implemented sensor system 60 may be trained into a trained neural network TNN by means of the disclosed training method 100.

Figure 8:
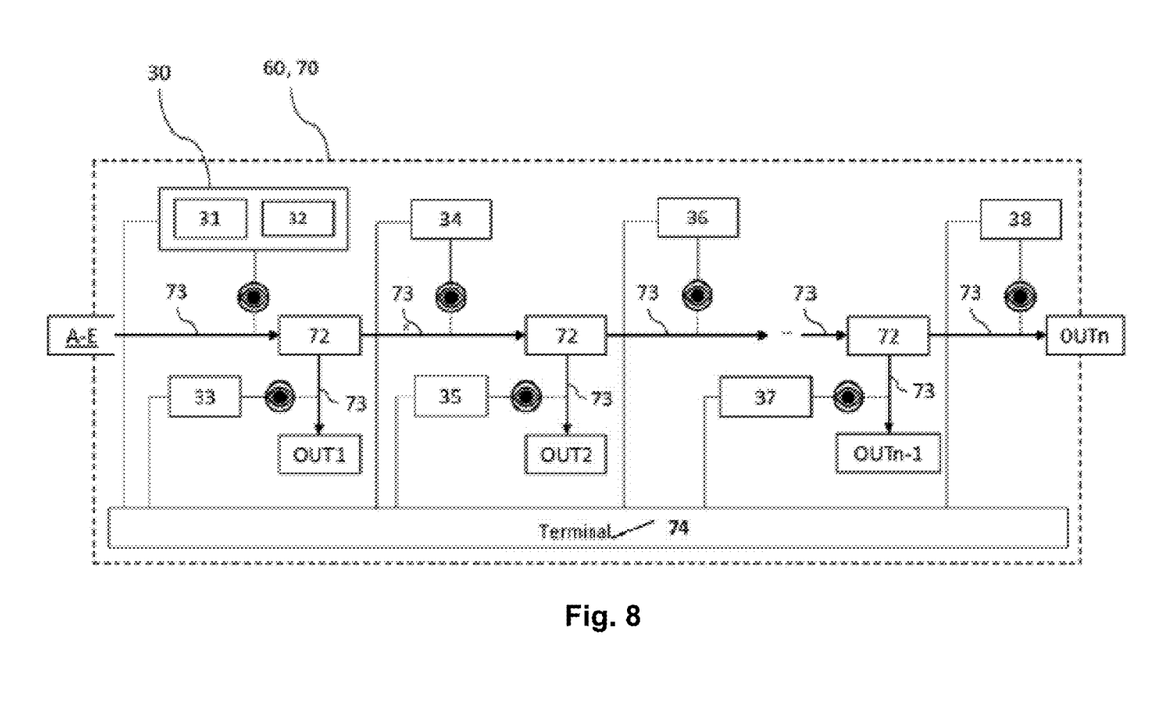
FIG. 8 shows the neural network-implemented sensor system according to one embodiment.

FIG. 8 shows a layout of a neural network-implemented sensor system 60 and a sorting system 70 of increased complexity. The sorting system 70 comprises a plurality of sorting units 72 which are configured to sort objects based on object classifications to move toward different output destinations OUT1, OUT2, OUTn−1 and OUTn. The neural network-implemented sensor system comprises a fusion sensor 30 comprising two different sensor technology design. In a preferred embodiment, this fusion sensor 30 comprises an RGB-sensor 31 and a volumetric sensor 32. The neural network-implemented sensor system 60 comprises further input imaging sensors 33-38 which are arranged to capture input image data at various streams from the sorting units 72. In one embodiment, one or more of the streams of bulk flow is enabled by conveyor belts 73.

Further, in one embodiment, the other input imaging sensors 33-38 may be RGB-sensors also.

However, depending on specifications of what objects shall be classified and/or sorted, other sensor technology designs may be desired. The one or the plurality of input imaging sensors 30, 30a-30e may be selected from a group of sensor technology designs including near infrared sensor, X-ray sensor, CMYK-sensor, RGB-sensor, a volumetric sensor, point measurement system for spectroscopy; and/or input imaging sensors having the same general sensor technology design but having different qualitative differences, such as resolution.

Further, although not shown, this sorting system 70 may be provided with auxiliary imaging sensors 40 to capture auxiliary image data 50** for use in classifying objects A, B according to the predetermined classifying scheme.

Figure 9:
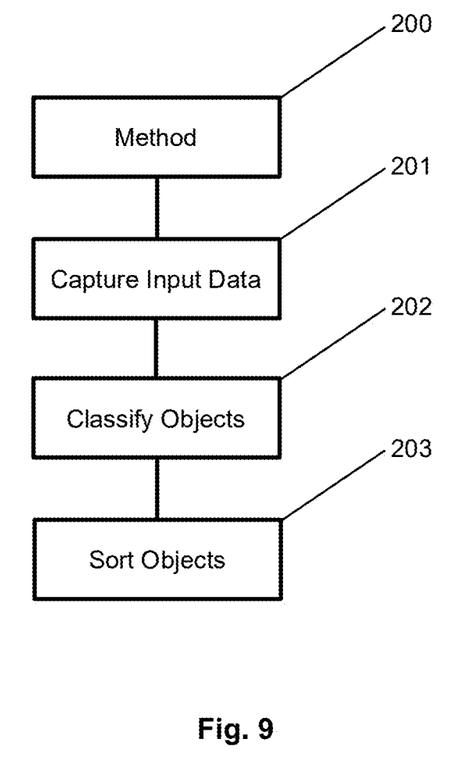
FIG. 9 shows a flowchart for a method for sorting objects in a bulk flow according to one embodiment.

FIG. 9 shows a flow chart of a sorting method for sorting objects A-E in a bulk flow by means of a sorting system 70 comprising a neural network-implemented sensor system 60 according to as previously explained. The method comprises the step of capturing 201 input image data 50* of objects A-E in the bulk flow at a first detection zone 50a-50e by means of at least one input imaging sensor 30a-30e of the first sensor technology design. The sorting method 200 further comprises the step of classifying depicted objects A*-E* by means of a processing unit, in the input image data 50* using the classification outputs by the trained neural network TNN of the computer-readable storage medium 10. The sorting method comprises the step of sorting 203 the objects A-E in the bulk flow by means of a sorting unit 72 based on how objects depicted A*-E* are classified.

In the drawings and specification, there have been disclosed preferred embodiments and examples of the invention and, although specific terms are employed, they are used in a generic and descriptive sense only and not for the purpose of limitation. The embodiments described with reference to the figures are certain preferred embodiments and are described with certain aspects in mind; further embodiments may be provided by combining these embodiments. However, the scope of the invention is set forth in the following claims.

The invention claimed is:

1. A method of training a neural network stored on a computer-readable storage medium for classifying objects in a bulk flow, i.e. a flow of objects wherein the objects are in bulk, the method comprising the steps of:
provided input image data depicting objects to be classified, which input image data is captured by means of an input imaging sensor of a first sensor technology design;
providing auxiliary image data depicting said or similar objects which are classified in accordance with a predetermined classifying scheme, and wherein said auxiliary image data is captured by means of an auxiliary imaging sensor of a second sensor technology design;
by means of a processing unit, train the neural network stored on the computer-readable storage medium to classify the depicted objects in the input image data based on classifications of depicted objects in the auxiliary image data,
wherein the depicted objects in the input image data correspond to objects in a bulk flow, and
wherein the second sensor technology design is different from the first sensor technology design,
wherein the input imaging sensor and the auxiliary imaging sensor depict said objects at different moments in time in respective detection zones, and wherein an image quality of the auxiliary image data is higher than an image quality of the input image data,
identifying a characterizing feature or a collection of characterizing features in the auxiliary image data making use of differences in the input image data and the auxiliary image data, and based on the characterizing feature or collection of characterizing features classifying the objects in bulk flow as a specific object type by means of the predetermined classifying scheme when the image quality of the auxiliary image data allows for more accurate classification, wherein the specific object type is established to allow a sorting system to sort objects in a bulk flow based on the specific object type.

2. The method according to claim 1, wherein the step of training the neural network stored on the computer-readable storage medium is further based on additional non-image data, or user specified data, of the objects to be classified.

3. The method according to claim 1, comprising the step of:

providing the neural network stored on the computer-readable storage medium in a neural network-implemented sensor system configured to capture said input image data of the bulk flow by means of at least one input imaging sensor of the first sensor technology design.

4. The method according to claim 3, wherein said auxiliary image data of the bulk flow is captured by means of at least one auxiliary imaging sensor of a classification- and/or sorting system, and which classification- and/or sorting system comprises means for classifying the objects depicted in the auxiliary image data according to the predetermined classifying scheme.

5. The method according to claim 1, comprising the step of:

providing first and at least a second input image data depicting objects to be classified, wherein the first and the at least second input image data are captured by means of a respective first and at least a second input imaging sensor of the first sensor technology design, the first input imaging sensor configured to capture input image data of the objects in the bulk flow in a first detection zone and the at least second input imaging sensor configured to capture input image data of the objects in the bulk flow in an at least second detection zone, wherein the at least second detection zone is different from the first detection zone and the step of training the neural network stored on the computer-readable storage medium involves using successful classification of depicted objects from a first input image data of the first and the at least a second input image data to infer classification of depicted objects in a second input image data of the first and the at least a second input image data.

6. The method according to claim 5, wherein at least two of the first and the at least second input imaging sensors are of different sensor technology designs.

7. The method according to claim 1, wherein the first sensor technology design and the second sensor technology design are selected from a group of sensor technology designs including near infrared sensor, X-ray sensor, CMYK-sensor, RGB-sensor, a volumetric sensor, point measurement system for spectroscopy, visible light spectroscopy, nir infrared spectroscopy, mid infrared spectroscopy, X-ray fluorescence sensors, electromagnetic sensors, laser sensor, multispectral systems using LED's, pulsed LED's or lasers, LIBS (laser induced breakdown spectroscopy), Fluorescence detection, detectors for visible or invisible markers, transmission spectroscopy, transflectance/intreractance spectroscopy, softness measurement, thermal camera, and/or wherein the first sensor technology design and the second sensor technology design are of the same general sensor technology design but have different qualitative differences.

8. A neural network-implemented sensor system comprising one or a plurality of input imaging sensors configured to capture input image data of objects in a bulk flow, and a computer-readable storage medium storing a trained neural network (TNN) which is trained by the method according to claim 1.

9. The neural network-implemented sensor system according to claim 8, configured to be arranged to a bulk flow distribution system and configured to classify the objects in the bulk flow distributed thereby.

10. The neural network-implemented sensor system according to claim 9, configured to sort the objects in the bulk flow by means of one or more sorting units based on classifications provided by the trained neural network (TNN), wherein the one or more sorting units are respectively arranged at or following a respective detection zone configured to detect a specific type of object within the bulk flow based on classifications provided by the trained neural network (TNN).

11. The neural network-implemented sensor system according to claim 8, configured to share the trained neural network (TNN) stored on the computer-readable storage medium to a second neural network-implemented sensor system.

12. The neural network-implemented sensor system according to claim 8, wherein the one or the plurality of input imaging sensors are selected from a group of sensor technology designs including near infrared sensor, X-ray sensor, CMYK-sensor, RGB-sensor, a volumetric sensor, point measurement system for spectroscopy, visible light spectroscopy, nir infrared spectroscopy, mid infrared spectroscopy, X-ray fluorescence sensors, electromagnetic sensors, laser sensor, multispectral systems using LED's, pulsed LED's or lasers, LIBS (laser induced breakdown spectroscopy), Fluorescence detection, detectors for visible or invisible markers, transmission spectroscopy, transflectance/intreractance spectroscopy, softness measurement, thermal camera, and/or wherein at least two of the plurality of input imaging sensors are of the same general sensor technology design but have different qualitative differences.

13. A method of sorting objects in a bulk flow by means of a sorting system comprising a neural network-implemented sensor system according to claim 9, the method comprising the steps of:

capturing input image data of the objects in the bulk flow at a first detection zone by means of at least one input imaging sensor of the first sensor technology design; by means of a processing unit, classify depicted objects in the input image data using the classification outputs by the trained neural network (TNN) of the computer-readable storage medium, and sorting the objects in the bulk flow by means of a sorting unit based on how objects depicted are classified.

14. The method according to claim 1, wherein an object of the objects at a first detection zone of the respective detection zones is obscured to some degree by other objects of the objects when depicted in the captured input image data, and the object at a second detection zone of the respective detection zone is obscured to a lesser degree by the other objects when depicted in the captured auxiliary image data, wherein the neural network is trained to classify objects when obscured to said some degree based on the classifications of the depicted objects in the auxiliary image data, the depicted objects including the object obscured to said lesser degree.

\* \* \* \* \*